April 29, 1941.　　　E. REANEY　　　2,240,444
PLANING TOOL
Filed Sept. 13, 1939　　　2 Sheets-Sheet 1
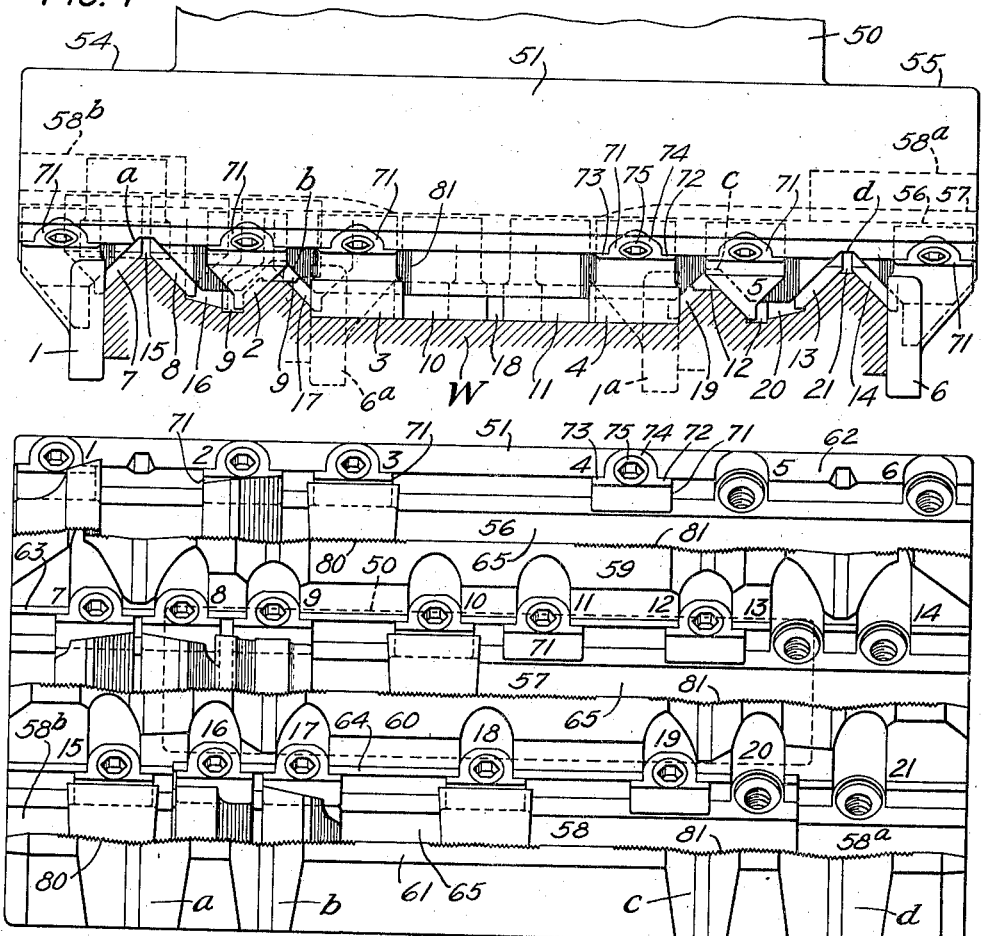

April 29, 1941.     E. REANEY     2,240,444
PLANING TOOL
Filed Sept. 13, 1939     2 Sheets-Sheet 2
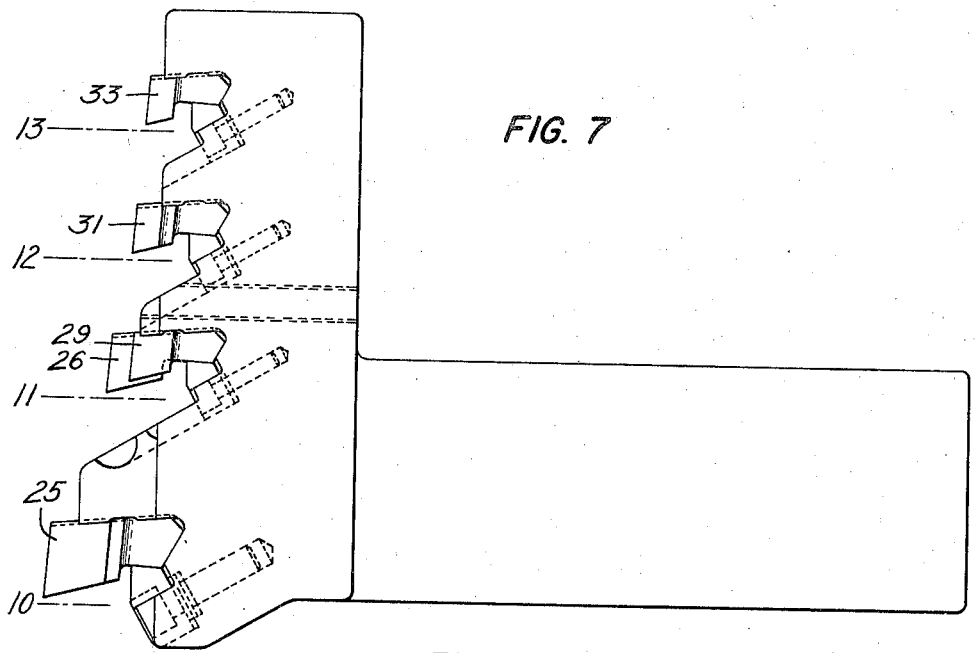
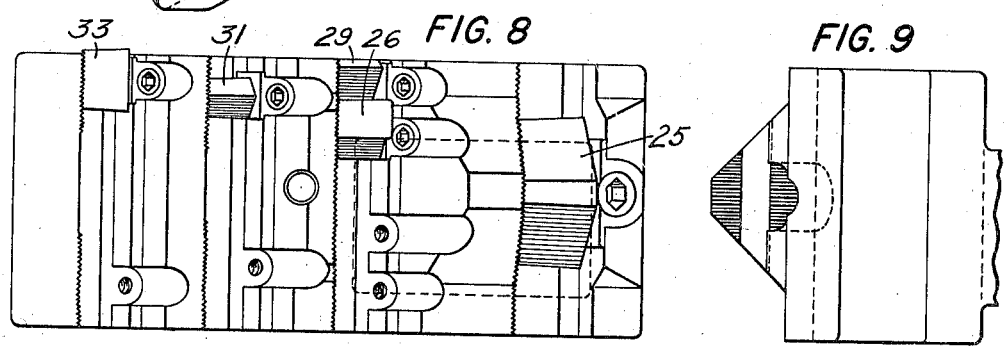
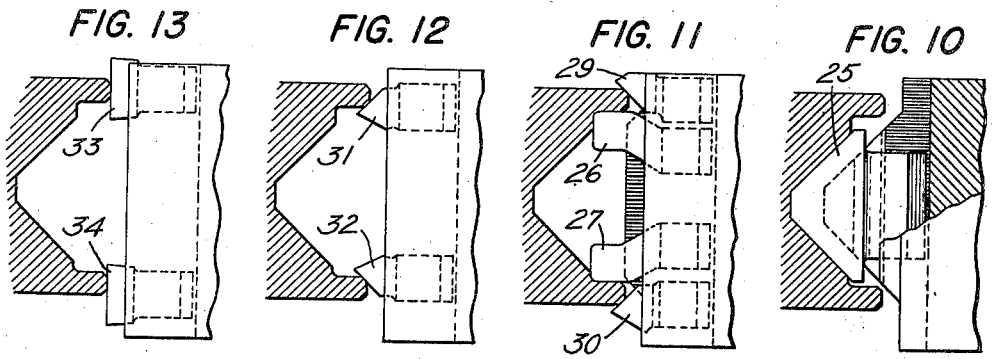
INVENTOR
Ernest Reaney
BY Albert F. Nathan
ATTORNEY Patented Apr. 29, 1941

2,240,444

UNITED STATES PATENT OFFICE 2,240,444

PLANING TOOL

Ernest Reaney, Stratford, Conn., assignor to The O. K. Tool Company, Inc., New York, N. Y., a corporation of New York Application September 13, 1939, Serial No. 294,621

9 Claims. (Cl. 29—97)

The present invention concerns an improved method and apparatus for machining relatively extensive surfaces of a workpiece, which surface does not all lie in a single plane. The invention relates more particularly to a tool structure of a character such as may be used for planing and analogous operations, in which a number of individually adjustable tool bits of various shapes and sizes may be securely clamped in a holder in transversely extending tiers or rows and used to machine selected areas, the aggregate of which constitutes the entire area or surface to be machined on the workpiece.

A primary object of the invention is to enable the user provided with such a tool structure to machine a surface of irregular contour accurately and efficiently with but a simple rectilinear movement between the tool and the work.

A further objective of the invention is to enable the user to perform machining operations with a planer on one or a gang of workpieces, which operations heretofore could be performed only singly and upon workpieces one at a time on a milling machine, only then however, with an elaborate and expensive set-up of tool fixtures and milling cutters.

Still a further aim of the invention is to render it unnecessary to resort to a rotary cutter machine and the heavy expense entailed in the purchase and maintenance of a wide range of milling cutters, arbors and spindles of varying sizes and capacities appropriate to machine a formed or profiled surface, and to render available a single tool structure, adjustable in its nature, by which the entire formed surface of the workpiece may be machined efficiently and economically by a relative rectilinear motion between the tool and work. This radical change in machining methods, in addition to effecting a substantial decrease in the machining costs upon a given workpiece, enables the plant manager to use his planing machines to far greater advantage than heretofore was possible, while at the same time release the milling machines for those many operations which are strictly and necessarily milling in character.

In attaining the objectives of the invention it is proposed to provide a holder member with a massive head portion somewhat wider in width than the total width of the surface to be machined, and with a shank portion adapted to be clamped securely to the planer tool carriage. The general plane of the head portion of the holder is perpendicular to the shank and has formed in its outer face a multiplicity of bit receiving recesses and supporting platforms extending in a direction transverse the tooling motion.

The bit supporting platforms are arranged one ahead of the other and are adapted to have clamped therein a plurality of tool bits whose cutting edges extend in various directions depending upon the relative angular position of the particular zone or area to be machined by the tool bits. By arranging the tool bits in tiers and staggering the bits in each tier relative to the bits in other tiers, the first tier of bits may be positioned so as to machine preselected regions of the workpiece. The second tier of bits may be arranged to machine other areas or zones of the workpiece, and the third following tier of tool bits may machine still other areas or zones of the workpiece. The machining operations performed by all of the different groups of tool bits, thus aggregate the entire surface of the workpiece that is to be machined.

A tool structure embodying the principles of the present invention possesses many advantages among which may be noted that each particular tool bit performs only a small fraction of the entire machining operation and may be so positioned in the tool head that the particular operation performed thereby does not conflict or interfere with the operations performed by preceding or succeeding tool bits. The tool bits mounted in each tier may also be positioned to perform a machining operation on the workpiece which must take precedence, in the order of time or sequence, over other operations to be performed thereon.

A further important advantage of a tool structure of this character is that each individual tool bit may have its cutting edges ground precisely to the required shape, and also formed with proper rake and clearance angles best adapted for the particular duty it is to perform. The invention possesses the further advantage that each bit is replaceable and adjustable individually of other tool bits to the end that a single tool structure may be repeatedly modified to suit the particular form and character of workpiece to be machined. To a large extent, the various tool bits are interchangeable and may be repeatedly rearranged in the holder to adapt a tool as a whole to various other and different workpiece contours. If a tool bit becomes dull, or for some reason fractured, it may be removed individually from the holder and reground or replaced by another without upsetting the positions of other tool bits therein and without requiring replacement of an entire cutting tool.

Other objects and advantages will be in part indicated in the following description and in part rendered apparent therefrom in connection with the annexed drawings.

To enable others skilled in the art so fully to apprehend the underlying features hereof that they embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a front view of a tool structure constructed in accordance with this invention, adapted to machine both sides and top of four V-shaped guide ribs and the connecting surfaces therebetween.

Fig. 2 is a face view of a tool head illustrating several tool bits clamped in position in a left hand portion; the bit clamp and recess in the central portion; and the recesses alone in the extreme right hand portion.

Fig. 3 is a side view of a tool structure illustrating more clearly the tier arrangement of bit platforms, inserted tool bits, and their respective clamping means.

Figs. 4, 5 and 6 represent diagrammatically the sequence of operations with a tool illustrated in Figs. 1–3.

Fig. 7 is a side view of a modified form of tool structure embodying this invention adapted more particularly to machine all the surfaces of a V channel shown in section lines in Figs. 10 to 13.

Figs. 8 and 9 are face and end views of the tool head structure illustrated in Fig. 7.

Figs. 10 to 13 are diagrammatic views through planes 10 to 13, respectively, of Fig. 7, illustrating the staggered relation of the tool bits and the sequence of the operations performed by the bits of the respective tiers.

Referring more particularly to Figs. 1 to 3, the planer tool structure therein illustrated comprises essentially of a sturdy shank member 50 forged with an equally sturdy head member 51 arranged substantially at right angles thereto. Portions of the head extend beyond the shank 50 and afford laterally extending abutment surfaces 52—55 which may seat against a portion of the machine frame thereby to provide a substantial backing for the tool holder as a whole. The front face of the head 51 is formed with a plurality of laterally extending bit recesses 56, 57, 58 extending substantially the full width of the holder. Integral portions of the holder intermediate the recesses project forward and provide tool bit platforms 59, 60, 61, and other portions of the tool holder 62, 63, 64, also extend forward and overlie a substantial portion of the bit recesses 56 to 58 and supporting platforms 59 to 61. The rear walls 65, of the recesses thus constituted, are preferably inclined forward with respect to the bit platform surfaces 66 and define a V-shaped recess for receiving the respective tool bits.

Each tool bit is formed with a flat bottom surface 67 that extends rearwardly and terminates in a forwardly inclined wall 68. The respective tool bits are generally L-shaped and have an upstanding portion 69 providing the cutting edges and other material for repeated grindings and a shank portion, the upper surfaces 70 of which, diverges rearwardly with respect to the bottom surface thereby forming a dovetailed shank.

Between the upper surface 70 of the bit shanks and the overlying portion 62 (63, 64) of the holder, a clamp member 71 in the form of a wedge is inserted. Each clamp is provided with laterally extending wings 72, 73 which abut against solid portions of the head member, and a central portion 74 through which a clamp screw 75 operates. Each clamp screw has threaded connection directly with the head member and extends in a direction along the line paralleling the line of contact of the wings 72, 73, with the body portion so that wedge 71 moves rearwardly and downwardly against surface 70 of the shank of the tool bit. By this construction of clamp each tool bit is pressed downwardly firmly in contact with the surface 66 of the platform 59 (60, 61) and simultaneously rearwardly into abutting relation with the abutment wall 65 in the rear of each recess. Clamp screws 75 have their heads recessed in the wedges 71 so as not to provide any projecting surface such as would be mutilated by or interfere with the freedom of chip movement.

As will be seen by referring to Fig. 3, the laterally extending tool bit platforms are spaced from each other in the direction of motion between the tool and work, a distance sufficient to provide a strong support for the bits and ample chip space between the tiers of bits. The lateral spacing of the tool bits of any one tier is for the purpose of avoiding interference between cutting edges. For example, where two surfaces of the workpiece to be machined lie in intersecting planes, it is not practical to machine those surfaces with a single tool bit or with two closely adjacent tool bits. To insure good definition at the line of intersection of the planes, the tool bits must overlap and therefore must follow one another. Likewise, where there are surfaces to be machined that lie in a channel, several tool bits cannot be accommodated within the channel if positioned to cut in the same plane. A staggered as well as successive relation of the tool bits is required. Similarly, with the machining of relatively wide flat surface, a staggered and successive relation of tool bits is required to avoid tool marks or lines in the finished surface.

The present conception of a tool structure embodies features enabling all of those desired ends to be achieved. As will be observed with reference to Fig. 2, the tool bits, in all of the tiers illustrated, may be positioned therein in spaced relation with each other, and the bits in each tier staggered with relation to the position of the bits in the other tiers so that various intersecting planes of the surfaces of a given workpiece may be machined without interference of one bit or cutting edge thereof with another and without danger of leaving tool marks on the workpiece.

The workpiece W illustrated in sectional outline in Fig. 1 represents a typical workpiece requiring the machining of both outer flanks, both level sides of the four V-shaped ribs or bearing ways, the top and bottom lands thereof, and the surfaces intervening. To machine such a surface three tiers of cutting bits may be used conveniently. For the purpose of this description, the cutting zones and bits of the first tier are numbered 1 to 6; those of the second tier are numbered 7 to 14; and those of the third tier 15 to 21. With regard to the first tier of bits—bits 1 and 6 machine both outer sides of the workpiece; laterally spaced therefrom bits 2 and 5 machine the outer beveled surfaces of the inner V guideway; and bits 3 and 4 machine bottom portions of the surface lying between the inner pair of guideways. Fig. 4 illustrates diagrammatically the zones or areas reached by the first tier of tool bits.

The second tier of bits immediately follow. Bits 7 and 8, 13 and 14 machine both beveled surfaces of the outer V guideways; compound cutting bits 9 and 12 machine the top lands of the inner pair of V guides and also the clearance channel defining the outer edge of each of those same guides; and flat nose bits 10 and 11 continue the finishing of still further portions of the flat surface intervening. Fig. 5 illustrates diagrammatically the surfaces completed by the second tier of bits and illustrates the definition attained at the intersection of the surfaces and the smooth surfaces obtained by staggering and overlapping of the tool bits.

The third tier of bits next to follow complete the machining operation by finishing the top lands of the outer V guide (bits 15 and 21); the bottom surface portions remaining between pairs of guides (bits 16 and 20); the inner bevel surface of each inner guide (bits 17 and 19); and the remainder of the flat surface between the two pairs of guides (bit 18). Fig. 6 diagrammatically illustrates the surfaces that are last machined and which completes the entire profile.

With respect to Figs. 4-6, the reference characters therein used correspond with references used for the bit stations in Figs. 1 and 2 to simplify the disclosure.

In the particular workpiece selected for this illustration, the pairs of V guides project upwardly a substantial distance from other surfaces to be machined and to avoid objectionable overhang of any of the tool bits, the forward face of the bit supporting body 51 may be transversely notched as at $a$, $b$, $c$, and $d$. The effect of such transverse recessing is to allow the high portions of the workpiece to project into the general plane of the supporting body, and conversely, to allow portions of the supporting body to project into the low regions of the workpiece. Where the nature of the profile demands, one or more of the bit platforms or portions thereof may be recessed more than others. Such a construction is illustrated at $58^a$ and $58^b$. In all cases, however, the extent of recessing of the body will be such as to afford a relatively wide range of adjustment for the tool bits. By virtue of such a construction no tool bit projects beyond its supporting platform unduly and a very compact and sturdy insertable bit tool structure for profile planing work is achieved.

A tool so constructed lends itself readily adaptable to a wide degree of modification in adapting the tool to the machining of different profiles or forms. To that end, it is preferable to form all of the tool bits with standard uniform shank portions which enables them to be clamped in position in the body in any of the cutting zones. The dotted outline $1^a$ and $6^a$ in Fig. 1 illustrates this interchangeability of tool bits from one position to another and the adaptability of the tool as a whole for ready conversion to one for machining quite a different profile or contour on the workpiece.

Modifications in the projected profile of the cutting edges is further attained by the present invention by providing a uniform series of serrations 80 on each tool bit and a more extensive series of like serrations 81 on the tool bit platforms at each working zone. By so interlocking the bits with the body, the bits are positively held from creeping or twisting laterally by biased or unbalanced tooling thrusts thereon and definiteness in location is maintained.

The interlocking serrations further enable the user to adjust the bits independently of each other a lateral direction in adapting the tool for machining modified shapes of workpieces. For example, tool bits 1 and 6 may be adjusted laterally to vary the overall width of the workpiece; bits 7 and 8 may be adjusted laterally as a unit thereby to shift the center line of the V guide, or independently of each other to change its dimensions. Similarly, bits 3 and 4 may be shifted to increase or decrease the width of the space between pairs of guides; bits 2 and 17 and bits 5 and 19 may be shifted to modify the dimensions or positions of the inner pair of guideways.

Figs. 7 to 13 of the drawings illustrate the invention embodied in a modified form of tool in which the tool bits are arranged in four rows or tiers and otherwise adapted to machine the inner surfaces of a V channel. Starting with a partially roughed out blank, a V-shaped tool bit 25 machines both beveled surfaces of the channel, then follow tool bits 26 and 27 which machine the inner surfaces of the marginal webs of the channel member and bits 29 and 30 which chamfer the outer corners thereof; then follow tool bits 31 and 32 which chamfer the inner corners of the webs; and then follow bits 33 and 34 which finish the top lands of the webs. The principles of the spaced relation of bits in any one tier and the staggered relation as between bits of different tiers is adhered to in this modified form for the reasons and purposes above explained. In this form of tool, as with the design illustrated in Figs. 1, 2 and 3, the individual tool bits are independently adjustable and positively interlocked with the body in any adjusted position.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A tool for profile planing combining a body member having its front face contoured similar to the profile of the workpiece and a plurality of tool bit receiving recesses formed in said contoured face, each recess extending in a direction transverse the direction of the line of motion between the tool and the work, and each recess being defined in part by a wall that constitutes a tool bit supporting platform; a plurality of individual but simultaneously operable tool bits on the platform of each recess; each separate bit being individually insertable in the recesses in the body member and having cutting edges for machining a fraction of the profiled area of the workpiece and each of said individual tool bits on each platform being laterally spaced from other tool bits on the same platform and also offset from the bits on other platforms so that the projection of the cutting edges of all of the tool bits is a profile of the finished workpiece; and individually operable clamping means for each of the individual tool bits.

2. A profile planing tool consisting of a body member having a substantially rectangular head portion, said head portion having formed in its front face a plurality of bit supporting platforms extending substantially unobstructedly the full width of the head; at least one flat bottomed tool bit on each of said platforms; said head portion also having integral portions thereof overlying said tool bit platforms; clamp means for the tool bits comprising a clamp element insertable between each bit and said overlying portion of the head, and independently operable means operatively engaging each of said clamp elements for actuating same to effect clamping of each bit firmly on its platform; and positive acting means for adjusting each of the bits on its platform to effect a change in the shape or extent of the total area machined by all of said bits.

3. A tool for profile planing consisting of a body member having integrally formed head and shank portions arranged substantially perpendicular to each other, said head portion having formed in its front face a plurality of laterally extending recesses, each recess extending substantially unobstructedly the full width of the head and the lower wall thereof constituting a tool bit supporting platform; at least one tool bit on the platform of each recess positioned laterally offset from the bit or bits on other platforms so that each succeeding bit in the direction of the planing motion operates upon a different zone or area of the workpiece to be machined and the areas machined by all of the bits aggregating the total machined surface of the workpiece; independently operable clamp means for each of said bits; and means for adjusting each of the bits laterally on its platform to modify the shape or extent of the total area machined by all of said bits.

4. A planer tool combining a body member having a head portion whose general plane extends parallel to the line of motion between the tool and workpiece, said head portion having formed in its face a plurality of tool bit receiving recesses, each recess extending in a direction transverse the said line of motion between tool and work and substantially unobstructedly the full width of the head, and each recess affording a lower wall constituting a tool bit supporting platform; a plurality of individually adjustable tool bits on the platform of each recess, each tool bit being laterally spaced from other tool bits on the same platform and also offset from the bits on other platforms so that succeeding bits in the direction of the tooling motion, operate upon different areas of the workpiece and the areas machined by all of the bits on all platforms aggregating the total machined surface of the workpiece; means for adjusting each of the said individual bits laterally on their respective platforms to modify the shape or extent of the total area machined by all of said bits, and clamping means for each tool bit selectively operable to effect insertion, removal, or adjustment of each individual tool bit independently of the others on the same or different platforms.

5. A planer tool combining a supporting body member having a plurality of tool bit receiving recesses formed in its front face, each of said recesses extending substantially unobstructedly the full width of the body and transverse the direction of the tooling motion; each of said recesses being also defined by a lower wall constituting a tool bit supporting platform and a rear wall; a plurality of laterally adjustable tool bits on the said platform of each of the recesses and each bit positioned laterally offset from the bits on other platforms so that each succeeding tier of bits in the direction of the tooling motion operate upon different laterally spaced areas of the workpiece; and means for clamping each bit firmly against the supporting platform and rear wall of its recess in a predetermined laterally adjusted position therein independently of other tool bits on the same platform whereby any tool bit may be replaced or adjusted along its platform to effect a modification in the shape or extent of area machined thereby without disturbing the position of other bits on the same platform.

6. A planer tool combining a body member having formed in its face a plurality of tool bit receiving recesses, each recess extending in a direction transverse the direction of the line of motion between the tool and the work, and each recess being defined in part by a wall that constitutes a tool bit supporting platform; a plurality of individually insertable tool bits on the platform of each recess, each individual bit being laterally spaced from other tool bits on the same platform and also offset from the bits on other platforms so that each platform of spaced bits operate upon spaced apart areas of the workpiece and the areas operated upon by the spaced bits of all platforms aggregating the total machined surface of the workpiece; and separate clamping means for each of the individual tool bits selectively operable to effect individual insertion or removal of the tool bits from the body member.

7. A planer tool for profiling work combining a supporting body member having a plurality of tool bit receiving recesses formed in its front face, each of said recesses being defined by a lower wall constituting a tool bit supporting platform and a rear abutment wall; a plurality of individually insertable tool bits seating on the said platforms having cutting edges not all in the same plane, each individual bit positioned laterally offset from other bits on the same and on other platforms so that each tier of bits operate simultaneously upon different profile areas of the workpiece and the tiers of bits following the first tier in the series operate upon areas adjacent certain of the areas operated upon by preceding tiers of bits; means for adjusting each bit independently of others on its platform; and means for clamping each bit firmly against the supporting platform and rear wall of its recess in a predetermined adjusted position independently of the settings of the other bits on the same platform.

8. A planer tool for profile work combining a supporting body member; a first series of individual tool bits mounted therein having cutting edges disposed to machine selected areas of the workpiece; a second series of individual tool bits mounted in the body member spaced in the direction of tooling motions from the bits of said first named series and having cutting edges disposed to machine different areas of the workpiece, each individual bit of each of said series being laterally spaced from each other and all bits of all of the series of bits being adapted to operate simultaneously on the workpiece; means for adjusting each of said individual bits laterally in the said supporting body independently of others in the same or different series; and means for clamping each bit firmly to the body in a predetermined adjusted position independently of the settings of other bits therein.

9. A tool holder comprising a body member having a head portion and a shank portion, said head portion extending in a plane substantially perpendicular to the general longitudinal axis of the shank and projecting laterally outwardly from the shank at least on three sides of the latter thereby forming rear abutment surfaces at the shank side of the head around the marginal regions of said head; and means confined solely to the forward side of said head for seating and clamping one or more tool bits to said side in a region axially aligned with the said shank or in a region of the head that projects laterally therefrom.

ERNEST REANEY.